J. W. SMITH.
Spring-Packing for Steam-Engines.

No. 228,225. Patented June 1, 1880.

UNITED STATES PATENT OFFICE.

JAMES W. SMITH, OF CLEVELAND, OHIO.

SPRING-PACKING FOR STEAM-ENGINES.

SPECIFICATION forming part of Letters Patent No. 228,225, dated June 1, 1880.

Application filed March 1, 1880. (Model.)

*To all whom it may concern:*

Be it known that I, JAMES WYLIE SMITH, of Cleveland, in the county of Cuyahoga and State of Ohio, have invented a certain new and Improved Steam-Engine-Cylinder Packing; and I do hereby declare that the following is a full, clear, and complete description thereof.

The nature of this invention relates to the piston-packing of steam-engines, and belongs to that class known as "spring-packing," whereby the packing-rings are expanded and held in contact with the cylinder by an adjustment of springs, instead of being expanded by the effective pressure of steam.

For a full and complete description of the aforesaid invention reference will be had to the following specification and accompanying drawings, making a part of the same, in which—

Figure 1:
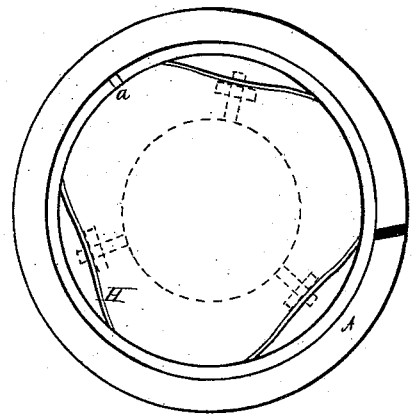
Figure 2:
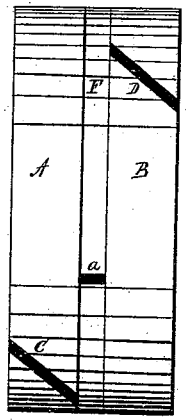
Figure 3:
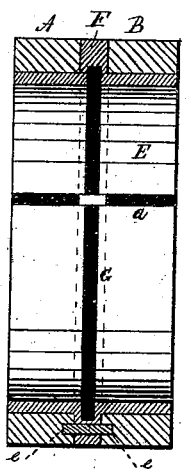

Figure 1 is a view of the edge of the packing. Fig. 2 is a view of the face of the same. Fig. 3 is a transverse section.

Like letters of reference refer to like parts in the several views.

The packing above referred to consists of two external rings, A and B, Figs. 2 and 3. Said rings are cut obliquely through, as seen at C and D, to allow of their expansion. E is an inner ring, fitting closely to the inside of the external rings, A and B. Said ring is also cut through to admit of its expansion, as seen at *a*. The subordinate inner ring alluded to is provided with a central annular rib, F, interposed between the inner edges of the two external rings, A B, and is in close contact therewith, and of even external surface, as shown in the drawings.

By the interposition of the rib F between the rings A and B said rings are made secure against the escape of steam from one side of the piston to the other; hence there can be no cutting of the piston or cylinder by the erosive action of the steam, thereby rendering the packing more durable and effective for the purpose designed.

On the inner side of the ring E is made a central annular groove, G, Fig. 3, extending into the body of the annular rib, as will be seen in said Fig. 3. The purpose of the said annular groove is to give more expansive elasticity to the ring, thereby rendering it more effective in its expansive adaptation to the cylinder than the ring would be in the event the rib and that part of the ring surrounded by it were solid.

The three rings are kept from moving rotatively by dowels *e*, projecting from the sides of the rib into corresponding holes in the rings A and B, as shown in Fig. 3. As above said, the rings are expanded by an arrangement of springs substantially the same as those in use in the ordinary spring-packing, which in Fig. 1 is indicated by the dotted lines, a description of which is not deemed essential in this connection, as the device is well known in the arts.

What I claim as my invention, and desire to secure by Letters Patent, is—

The piston-packing for steam-engines consisting of the external rings, A and B, internal divided ring, E, having an external annular rib interposed between the rings A and B, and having an internal groove immediately within the said annular ring, constructed and arranged as described, in combination with adjusting screws and springs, piston-head, and follower, as and for the purpose set forth.

JAMES WYLIE SMITH.

Witnesses:
J. H. BURRIDGE,
H. BORN.